United States Patent [19]

Beckert et al.

[11] 4,296,294

[45] Oct. 20, 1981

[54] METHOD AND APPARATUS FOR DRYING AND SETTING THE ADHESIVE ON BOOKS BY VAPORIZATION OF WATER USING RF ENERGY

[75] Inventors: Alexander Beckert, Wien-Osterreich, Austria; Karl-Heinz Knobbe, Ellerbeck, Fed. Rep. of Germany

[73] Assignee: Reinhard Mohn GmbH, Gutersloh, Fed. Rep. of Germany

[21] Appl. No.: 960,269

[22] Filed: Nov. 13, 1978

Related U.S. Application Data

[63] Continuation of Ser. No. 728,576, Oct. 1, 1976, abandoned, which is a continuation-in-part of Ser. No. 581,616, May 29, 1975, Pat. No. 4,014,732.

[30] Foreign Application Priority Data

Jun. 1, 1974 [DE] Fed. Rep. of Germany ....... 2426704
Nov. 29, 1975 [DE] Fed. Rep. of Germany ....... 2553816

[51] Int. Cl.$^3$ .......................... H05B 6/54; B32B 19/02

[52] U.S. Cl. .............................. 219/10.41; 219/10.81; 219/10.71; 219/10.75; 219/10.53; 156/274; 156/477 B; 156/379.6; 34/1

[58] Field of Search ............... 219/10.53, 10.81, 10.41, 219/10.71, 10.61, 10.75, 10.77; 156/380, 272, 273, 274, 477 R, 477 B; 34/1

[56] References Cited

U.S. PATENT DOCUMENTS

| | | | |
|---|---|---|---|
| 2,582,806 | 1/1952 | Nes et al. | 219/10.81 |
| 2,588,811 | 3/1952 | Dippel et al. | 219/10.61 |
| 3,149,217 | 9/1964 | Reed et al. | 219/10.53 |
| 3,701,875 | 10/1972 | Witsey et al. | 219/10.81 |
| 3,761,670 | 9/1973 | Slaats et al. | 219/10.81 X |

*Primary Examiner*—C. L. Albritton
*Assistant Examiner*—Philip H. Leung
*Attorney, Agent, or Firm*—Allison C. Collard; Thomas M. Galgano

[57] ABSTRACT

A method and apparatus for drying and setting the adhesive on the backs of books contained in book blocks or similar articles by vaporizing the water using high frequency RF energy. The books are generally mounted in clamps and moved on a conveyor from the input of the book binding machine through a ventilation system to its output. A high frequency RF field is disposed along the conveyor and has a plurality of spaced apart RF electrodes wherein the electrodes adjacent to the input and output are more closely spaced together than those in the center of the machine so that the energy of the high frequency RF field can be varied in an inverse proportional relationship to the dielectric loss factor of the adhesive layer during the drying cycle.

7 Claims, 4 Drawing Figures

METHOD AND APPARATUS FOR DRYING AND SETTING THE ADHESIVE ON BOOKS BY VAPORIZATION OF WATER USING RF ENERGY

This is a continuation of application Ser. No. 728,576, filed Oct. 1, 1976, which in turn, is a continuation-in-part of application Ser. No. 581,616, filed May 29, 1975 (now U.S. Pat. No. 4,014,732) the subject matter of which is incorporated herein by reference thereto.

The present invention relates to a method for drying and setting of adhesive on backs of books or similar articles, whereby the back of the books or similar articles are guided through a high frequency leakage or stray field. Furthermore, the invention relates to a device for carrying out the inventive method.

The adhesive is dried in a high frequency electrical field due to the dielectric heating of the adhesive layer. The energy generated by a high frequency generator is coupled to the electrodes, so that the high frequency electromagnetic oscillation acts on the back of the book block which is provided with adhesive. Since the water in the adhesive is highly dielectric, there is considerable resistance against the penetration of the RF energy. The higher the resistance, the higher is the heat development. This heat evaporates the water in the adhesive in a relatively short time period.

Methods for drying and setting of the adhesive on book block backs are known which operate with the energy of a high frequency leakage field. In the known methods, the energy distribution of the leakage field is constant throughout the total drying operation. If in this case, the RF energy is too high, the evaporation pressure of the water in the adhesive becomes too large and the adhesive layer is broken up. In order to prevent too high a vapor pressure, a correspondingly low energy level must be chosen which causes relatively long drying periods of about 60 seconds. Hence, with the latter method, it is unavoidable that a water residue remains in the adhesive towards the end of the drying cycle, because the relatively low leakage field energy is unable to vaporize this water residue in the adhesive.

It is therefore an object of the invention to overcome the disadvantages of the known methods and to assure a drying process which can be carried out in the shortest time period possible without breaking up the adhesive layer.

In accordance with the inventive method, book blocks or similar articles are fed through a high frequency RF field so that during the drying cycle, the RF energy is varied in accordance with the dielectric loss factor of the adhesive layer. This is preferably obtained by continuously increasing the field strength of the high frequency RF field as the water residue in the adhesive decreases. In particular, the distance of the RF electrodes of the leakage field decreases from the start of the leakage field to the end thereof. For a drying path of 1.5 m, the space of the distance from electrode to electrode is at the beginning 8 cm and then between 1.4 and 0.4 cm, in particular 1.2 cm.

It is particularly favorable to employ a high frequency of 27.12 $MH_z$ at an effective output capacity of 10 Kw. Thereby, on a drying path of about 2 m to 4 m, 4500 book blocks per hour made of printing paper having a thickness of 30 mm and a back book length of 220 mm which are provided with cold adhesive having about 35% of water contet, may be dried. When 20 Kw effective capacity is used, 6,500 book specimens may be dried free from all residue water per hour, having a back length of up to 140 cm.

Since a constant relationship exists between the back surface of the book, the high frequency RF power and the speed of the book block, and in particular the water contact at the start of the cycle in the dispersion adhesive, the most favorable energy distribution of the high frequency leakage field can be established during the drying cycle at each individual application. It is of importance that during the drying cycle, the temperature in the adhesive be held constant and should preferably be at the vaporization temperature of water.

A variation of the field strength of the high frequency leakage field can be carried out with other measures. For example, it is possible to adjust the field strength by employing induction and thereby change the voltage between the electrodes while the electrodes are arranged in equal distance with respect to each other. Furthermore, the distance of the book block from the electrodes of a constant high frequency RF field may be changed in time, so that the leakage field energy of the evaporation curve of the water is adjusted in the adhesive, or in that the book block may be fed with different speeds.

It was surprising to find that in accordance with the inventive method, the drying time for a book block is only 2 to 6 seconds, without breaking up the adhesive layer or the backs of the book blocks. As a result of this inventive method, the cooling time may be reduced to 30 seconds from 60 seconds which is an appreciable reduction. The method is particularly advantageous for drying the adhesive on the backs of book blocks, telephone books, and pocket books. A particularly increased binding quality is obtained and the energy use is at an optimum.

In accordance with a preferred embodiment of the invention and at the beginning of the drying cycle, a an energy pulse of short duration is introduced, so as to bring the temperature of the adhesive very quickly up to the evaporation temperature of the water. The portion of this preheating should be about 10% of the total drying time and preferably in a time period of 0.2 to 0.4 seconds. The energy pulse is obtained preferably by a high field strength of the high frequency RF field at the beginning of the drying cycle which is obtained by a slightly even distance of the electrodes at the beginning of the RF field.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention disclosed.

In the drawings wherein similar reference numerals denote similar elements throughout the several views:

FIG. 4 is a perspective view of the oblique mounting of the electrodes on the electrode supports of the apparatus.

Figure 1:
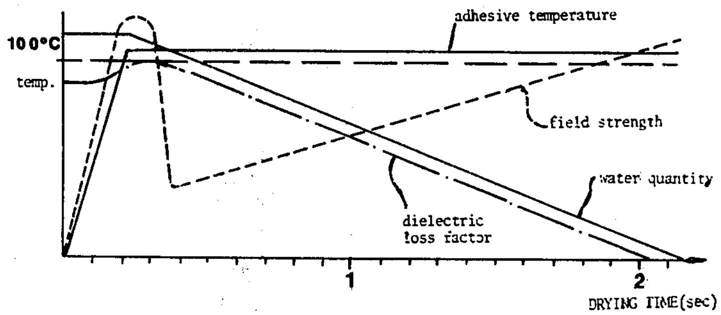
FIG. 1 is a plot of temperature vs. drying time showing curves of water quantity, dielectric loss factor and field strength.

The diagram of FIG. 1 explains the correlation between the temperature of the adhesive, the water quantity, the dielectric loss factor and the field strength of the high frequency leakage field in accordance with the inventive method. Due to the energy pulse during the first 0.2 to 0.4 seconds, the vaporization temperature of the water is reached in a very short time. In view of the reduction of water and subsequent continuous increase of the energy, the temperature of the adhesive remains constant. Due to the short drying time, the inventive method is particularly suitable for direct use in a book binding machine, whereby it is particularly advantageous if the book block is still clamped in book block clamps of the book binding machine during the drying and setting of the adhesive.

Accordingly, the subject invention includes also a combination book binding machine with a high frequency drying device. Preferably, the drying device is provided in the finishing range of the book binding machine cycle. However, a plurality of drying devices may be provided in the book binding machine if a plurality of adhesive stages are provided. The arrangement of the high frequency drying device in the book binding machine is not so obvious since the mass of the block clamps when fed with the high frequency RF field have the effect that the high frequency field is built up between the mass of the book block clamps and an electrode, instead of between the adjacent electrodes. The adjacent high frequency electrodes are arranged or connected with respect to each other in such a manner that the voltage difference between adjacent electrodes is larger than between an electrode and a book block clamp.

In a preferred embodiment of the invention, adjacent electrodes have a voltage which is obtained by a phase displacement feeding of the electrodes. Due to the preferred phase displacement by of about 180° across a voltage divider with a coaxial cable, it is possible that the voltage difference of the electrode with respect to the mass amounts to about only one half of the voltage difference between electrode to electrode. Since the mass is neutral with respect to the high frequency device, no high frequency current flows into the machine body through the mass engaging the clamps. In this way, it is possible to approach the high frequency electrode with the clamps at a distance of about 10 to 16 mm.

Figure 2:
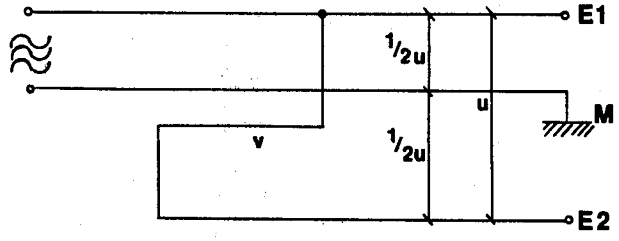
FIG. 2 is an electrical circuit diagram of the electrodes.

FIG. 2 is a circuit diagram of the electrodes. From the diagram, it can be seen that the electrodes E1 and E2 are connected with each other by means of a delay line cable V which effects a phase displacement by about 180°. A coaxial cable is preferred as the delay line cable. With respect to mass M, electrodes E1 and E2 have half of the voltage drop which they commonly contain. The delay line cable is 5.53 m by using a high frequency of 27.12 $MH_z$, and therefore effects a phase displacement of $1.84\times10^{-8}$seconds. Naturally, the phase displacement may be achieved by means of a corresponding arrangement of inductive and capacitive components.

Figure 3:
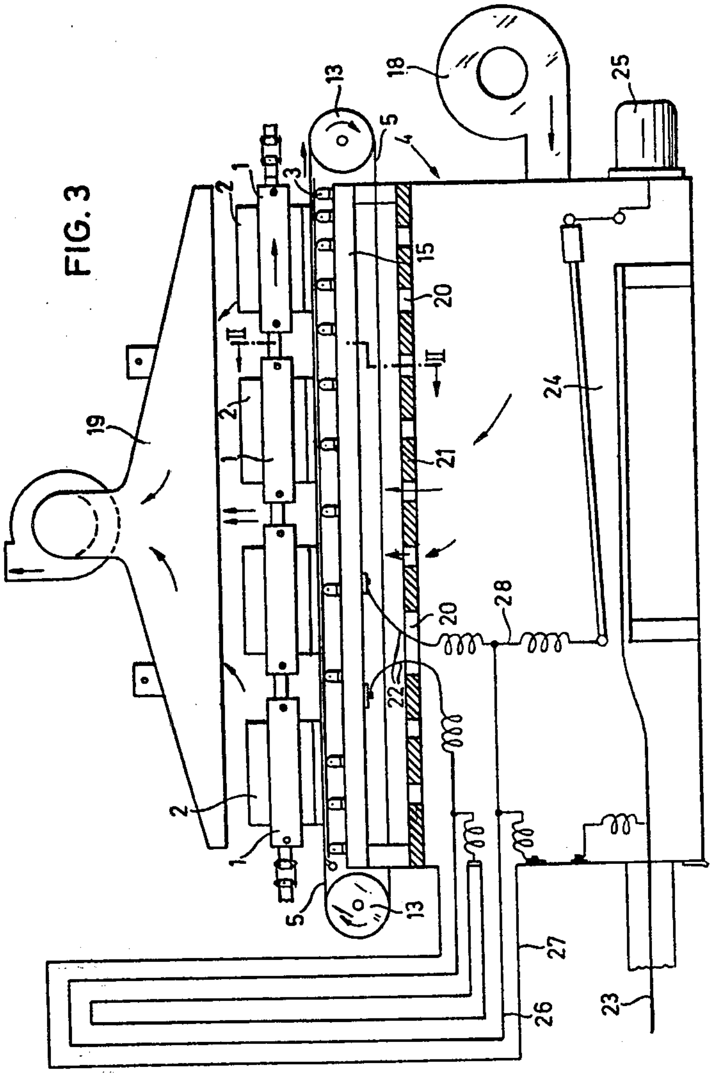
FIG. 3 is an apparatus for carrying out the inventive method.

FIG. 3 shows a device for carrying out the inventive method. The device is part of a very well known book binding machine which is not shown, and the inventive drying device is the last station of this book binding machine. In a known manner, the book binding machine is provided with transport clamps 1 with which the blocks of books are retained. The book blocks, while moving through the machine, are milled, provided with a layer of adhesive and a strip of paper gauze or the like, and are then dried in the inventive drying device. For the purpose of drying the adhesive layer, the inventive device is provided with high frequency or RF electrodes 3, which are arranged with respect to book blocks 2 so that the backs of the book blocks which are providied with the adhesive layer are fed through the high frequency field generated by electrodes 3. This causes drying of the adhesive, that is, the vaporization of the wetness contained therein. The RF electrodes 3 are mounted on a frame 4 having a conveyor belt 5, which runs above RF electrodes 3, and on which book backs 2 are placed. A stationary insulating layer 6 is provided between the transport belt 5 and RF electrodes 3 which preferably consists of TEFLON, and therefore provides a low friction coefficient with transport belt 5. Thus, a constant mechanical stress on RF electrodes 3 is prevented. Transport belt 5, which is fed over the two transport rollers 13, moves with the same speed through transport clamps 1, so that there is no relative movement between book blocks 2 and the transport belt.

A high frequency field is generated by the RF electrodes 3 through which book blocks 2 are fed, whereby this high frequency field generates a very quick drying, that is vaporization of the wetness contained in the adhesive. The power of the high frequency electrodes 3 is sufficiently high so that a complete drying and therefore a complete setting of the adhesive layer on the back of the block of books takes place during the time wherein one book block 2 moves through the inventive drying device. The throughput speed is identical with the operating speed of the book binding machine, whereby the drying device is part of the book binding machine, since the transport clamps retaining the book blocks 2 move through the total book binding machine including the drying device. Since the operating speed of the book binding machine is rather high, the driving out of the wetness from the adhesive layer must be carried out rapidly in the clamping device. For this purpose, high power RF-electrodes are required, and a clamping of the book block in the book block clamps is required, to prevent an eventual bubble formation of the adhesive. To assure a high drying speed, an air exhaust system is provided having a blower 18 which is mounted beneath transport belt 5, and an exhaust means 19 which is provided above transport belt 5 for book blocks 2. The frame is essentially formed by a closed housing which is provided at its upper portion with a base plate 21 having a plurality of apertures 20. The air stream, generated by blower 18, penetrates through base plate 21. The current supply connection to RF electrodes 3 inside of frame 4 is made possible by means of feed lines 22. The air exhaust system, which consists of blower 18 and exhaust 19 is advantageous since as a result of the very high power of RF electrodes 3, not a prompt evaporization of the water in the adhesive takes place in the first section of transport belt 5. However, a large evaporization quantity is set free due to the period of dwell and the generated water vapor must immediately be exhausted, to prevent a penetration of the water vapor into book block 5, otherwise the individual pages of book block 2 would warp so as to reduce the quality of the book.

Preferably, RF electrodes 3 are mounted obliquely with respect to the transport direction of book block 2, so that they are spaced apart differently with respect to each other over the total length of transport belt 5. At the beginning of the drying cycle, the electrodes are closely spread apart with an even distance to each other. The distance is then increased in the center portion, and decreased at the end of the cycle. Thus, during the introduction of book blocks 2 into the drying cycle, there is a prompt heating of the adhesive layer. When the book blocks reach the center portion, the temperature is maintained. Near the end of the cycle, the temperature is increased by providing a prompt and sudden increase in heat before the books leave the drying device. This assures that all of the residue water will be removed from the adhesive layer. Thus, the adhesive layer will be completely dried out and set, so as to enable an immediate further processing of the book blocks.

Hence, interruptions in the operating process for making the books are prevented resulting in an appreciable saving of time. Furthermore, due to the inventive drying device, an appreciable advantage is obtained since the book blocks which leave the drying device have the required shape of a quality book. The drying and setting of the adhesive layer still takes place in the range wherein the book block 2 is retained in the transport clamps so as to prevent a displacement and thus a deformation of book block 2.

In frame 4 of the inventive device, all the required means are present which are necessary to generate a high frequency field such as a supply cable 23, a condenser 24, as well as an actual valve control 25 and a voltage divider 28. The electrode supports 15 are fed by cables 22 which are connected with respect to each other by means of a coaxial delay cable 26 27. Due to this arrangement, it is possible that the high frequency drying device may be directly integrated into a book binding machine. In the design of the circuit of electrode supports 15, the adjacent electrodes are fed with a phase displacement of 180° C. Thereby, a voltage is supplied between electrode 3 and transport clamp 1, which is half of the size of the voltage between two adjacent electrodes.

While only a single embodiment of the present invention has been shown and described, it will be obvious to those skilled in the art that many changes and modifications may be made thereunto without departing from the spirit and scope of the invention.

What is claimed is:

1. An improved method for drying and setting an adhesive layer applied to the backs of book blocks by passing the book blocks by means of clamps along a travel path through a high frequency leakage field to vaporize the water in the adhesive, the improvement comprising the steps of:

subjecting the adhesive layer on the back of said book blocks to a high frequency leakage field of high strength to heat the adhesive layer to a desired vaporization and drying temperature;

maintaining said desired temperature until said adhesive layer is completely dried and set by varying the strength of said high frequency leakage field along said travel path, said field strength initially being substantially reduced following heating of said adhesive layer to said desired temperature and thereafter continuously increased in inverse proportion to the dielectric loss factor of said adhesive layer, said high energy leakage field being produced by a plurality of RF electrodes spaced-apart along one side of the travel path of said book blocks in an oblique manner relative to said travel path and wherein said step of subjecting and maintaining comprises varying the spacing between said electrodes along said travel path, said electrodes being spaced relatively close together at the beginning and end of said travel path and being spaced further apart in the center range of said travel path, with the spacing between said electrodes decreasing from said center range to the end of said travel path, and wherein adjacent electrodes are fed with 180° phase displaced voltages so that the voltage difference between adjacent electrodes is larger than between an electrode and a clamp.

2. The method according to claim 1, wherein said travel path is approximately 1.5 m and the decrease in spacing of said electrodes between said center range to the end of said travel path is between 1.4 cm and 0.4 cm.

3. The method according to claim 1, wherein said electrodes emit a high frequency of about 27.12 $MH_z$.

4. The method according to claim 1, wherein said steps are carried out in a time period of between 2 and 6 seconds.

5. The method according to claim 1, additionally including the step of air drying the book blocks for about 30 to 60 seconds subsequent to said subjecting and maintaining steps.

6. The method according to claim 4, wherein said subjecting step is effected in a time period between about 0.2 to 0.4 seconds.

7. A book binding machine for drying and setting an adhesive layer on the backs of book blocks by vaporization of the water in the adhesive by passing the book blocks along a travel path through a high frequency leakage field of the type wherein clamps mounted on a conveyor move the book blocks from the input of the machine to its output comprising:

a plurality of RF electrodes spaced apart along one side of a portion of the travel path of said book blocks in an oblique manner relative to said travel path for emitting a high frequency leakage field, said electrodes being more closely spaced together at the start of said portion of said travel path than in the center range thereof; and means for feeding adjacent electrodes with 180° phase displaced voltages so that the voltage difference between adjacent electrodes is larger than between an electrode and a clamp, said means for feeding comprising a supply line, a condenser coupled to said supply line, and voltage divider means coupled between said condenser and said electrodes, and a branching coaxial delay cable coupled between said voltage divider and every other electrode so as to effect said 180° phase displacement.

* * * * *